United States Patent [19]
Olofsson

[11] Patent Number: 5,141,374
[45] Date of Patent: Aug. 25, 1992

[54] LOCK NUT DEVICE

[75] Inventor: Niclas Olofsson, Göteborg, Sweden

[73] Assignee: AB Volvo Penta, Goteborg, Sweden

[21] Appl. No.: 724,890

[22] Filed: Jul. 2, 1991

[30] Foreign Application Priority Data

Jul. 2, 1990 [SE] Sweden .............................. 9002322

[51] Int. Cl.$^5$ ...................... F16B 39/32; F16B 39/284
[52] U.S. Cl. ................... 411/141; 411/194; 411/198; 411/203; 411/985
[58] Field of Search .............. 411/114, 115, 134, 135, 411/140, 141, 194, 197, 198, 217, 950, 951, 970, 977, 978, 985, 987, 203; 403/19–21, 359

[56] References Cited

U.S. PATENT DOCUMENTS

| 866,451 | 9/1907 | Foraker et al. | |
|---|---|---|---|
| 2,792,084 | 5/1957 | Mossey | 411/978 |
| 4,648,768 | 3/1987 | Hambric | 411/217 |
| 4,812,094 | 3/1989 | Grube | |
| 4,880,085 | 11/1989 | Taylor | 403/359 |
| 4,881,842 | 11/1989 | Farrell et al. | 403/359 |
| 4,932,809 | 6/1990 | Kopp | 403/359 |

FOREIGN PATENT DOCUMENTS

| 577949 | 9/1924 | France . |
| 696434 | 12/1930 | France . |
| 387082 | 8/1976 | Sweden . |
| 452973 | 1/1988 | Sweden . |
| 1254149 | 11/1971 | United Kingdom . |

Primary Examiner—Neill R. Wilson
Attorney, Agent, or Firm—Young & Thompson

[57] ABSTRACT

A lock nut device consists of a lock nut (22) and a lock spring (31). The spring is bent into an U-shape and extends in a axial plane over the nut. It has spring legs (32) lying in grooves (25) in the nut and has end portions formed for engagement with the profile portion (16) on a non-rotatable element (4). In the engagement position, the legs are at such a distance from the nut surface that, with the aid of a socket forced over the nut, they can be pressed towards the nut surface, thus moving the end portion from the engagement position.

12 Claims, 3 Drawing Sheets

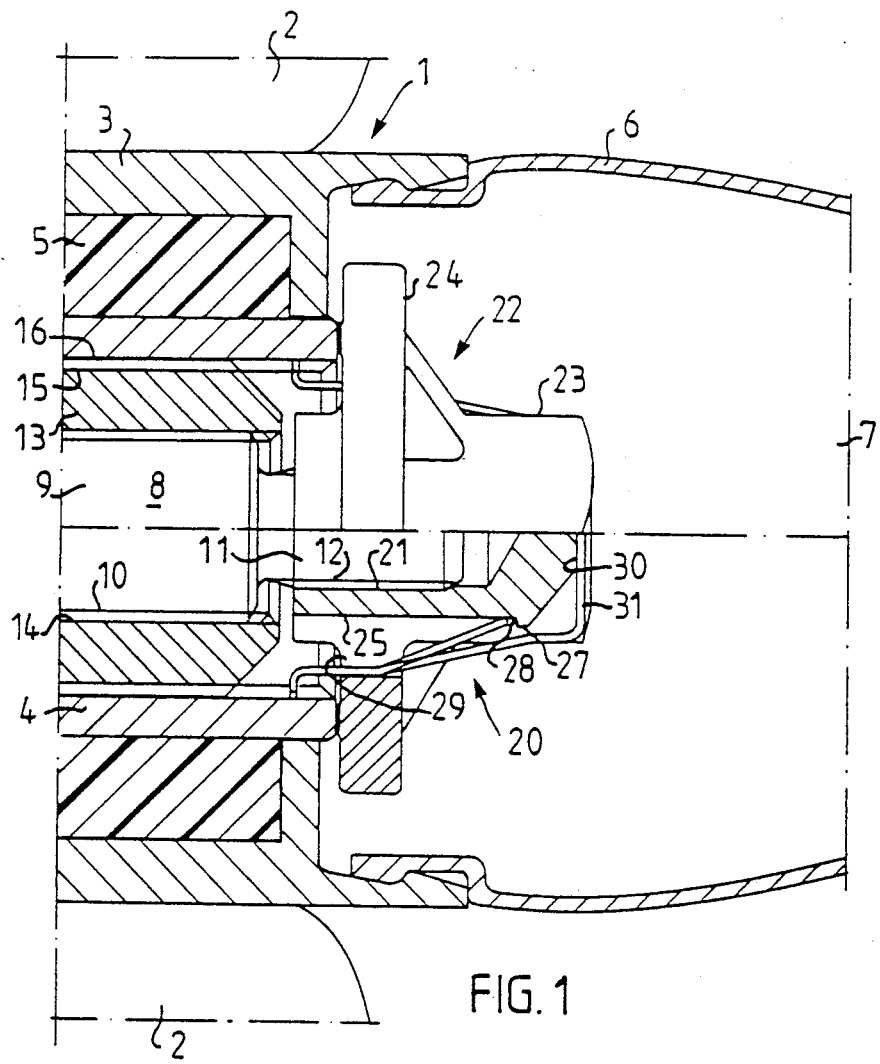
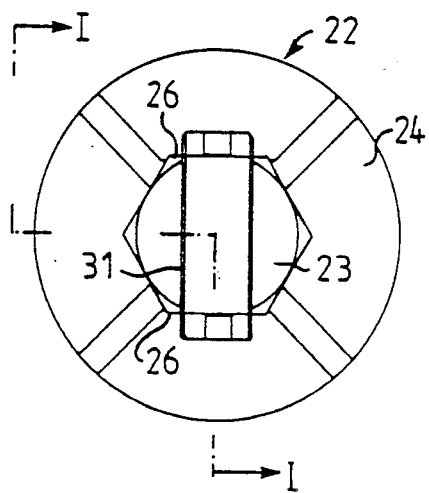 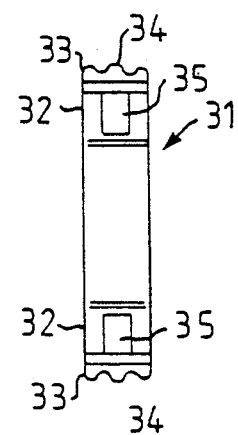 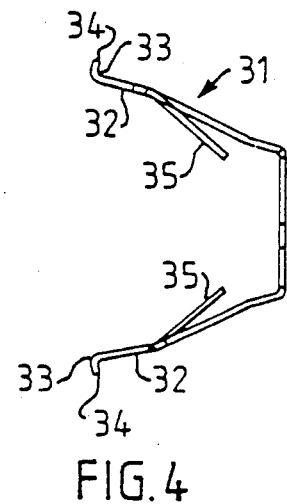
FIG.1
FIG.2  FIG.3  FIG.4

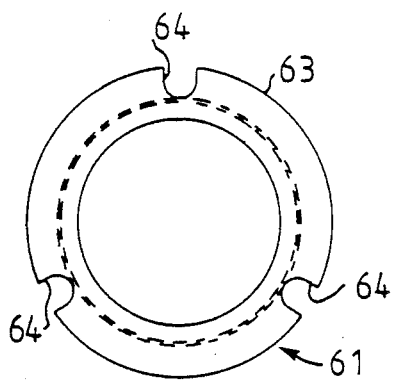
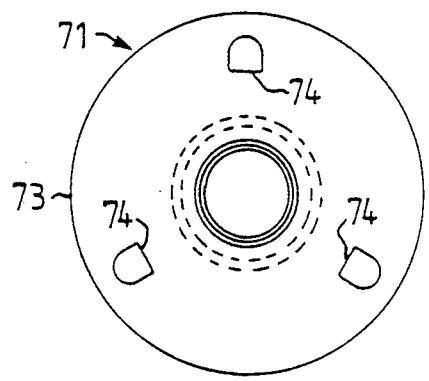
FIG.6a
FIG.6b
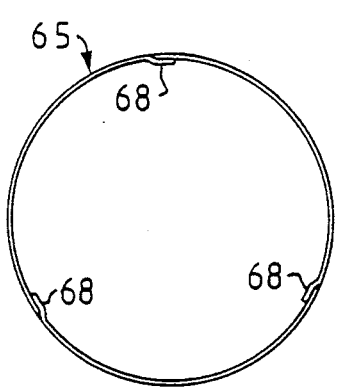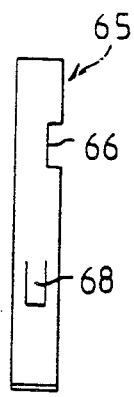
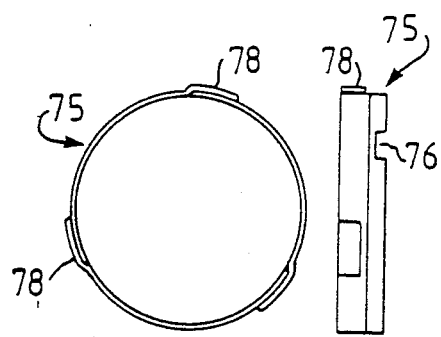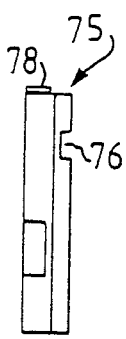
FIG.7a  FIG.7b  FIG.8a  FIG.8b

LOCK NUT DEVICE

FIELD OF THE INVENTION

The present invention relates in general to a lock nut device comprising, firstly, a threaded nut element, the threads of which are disposed to engage threads on another element, said nut element having a profiled portion for engagement with a tool and, secondly, a locking element which can be non-rotatably coupled to, on the one hand, the nut element and, on the other hand, said second element and/or an element non-rotatably coupled thereto.

In particular, the invention relates to such a lock nut device which is particularly suited for axially fixing an internally splined propeller hub on an externally splined propeller shaft portion.

BACKGROUND OF THE INVENTION

A number of different solutions are known for fixing nuts against rotation, and these are used to axially fix components, which either rotate themselves relative to their axes or are disposed on a rotating shaft. One solution which is common in, inter alia, the front wheel hub in passenger cars, uses a so-called crown nut, which is fixed against rotation by a split pin inserted into a radial bore in the shaft. Another solution uses a washer carried by the nut, said washer having an internal profile, e.g. a projection extending into an axial groove in the threaded portion of the shaft end. One or more portions of the outer periphery of the washer are bent over the nut providing shaped engagement between the components. A third known solution, which is particularly used for locking a propeller hub on a splined propeller shaft, uses a thrust washer provided with internal splines engaging the splines of the shaft. The outer periphery of the washer is toothed. A lock washer shaped as a hexagonal bowl with tabs spaced around its periphery is tigthened against the thrust washer by the nut, whereafter the taps are bent between the teeth of the thrust washer so that the nut is locked against rotation on the shaft. All of the solutions described are dependent on a permanent deformation of some component after tightening of the nut.

One disadvantage of this is that the locking elements cannot, or in any case should not, be reused for reassembly, since repeated deformation weakens the material and makes the locking less secure. Another disadvantage is that the work of bending tabs or inserting and splitting a split pin requires a certain amount of extra space radially outside the nut, which limits the possibility of using such locking devices in confined spaces. Furthermore, the components must be fully visible and accessible in order to be assured to proper assembly.

SUMMARY OF THE INVENTION

The purpose of the present invention is in general to provide a lock nut device of the type described by way of introduction, which eliminates the need to deform the locking means, requires little or no space radially outside the nut; and can be used in locations which are not at all visible.

This is achieved according to the invention by virture of the fact that the locking element is an at least partially resilient element with a portion extending over the tool engaging profile portion of the nut element and is formed so that the locking element is forced out of engagement with said element and/or the nut element when a tool is moved into engagement with the profiled engagement portion of the nut element.

The invention is based on the basic idea that, when using a conventional hex nut, for example, a portion of a spring lock element can extend beyond the engagement surface of the nut, in the form of a lever or pivot arm, with which a common wrench socket, when slipped over the nut, comes into contact and imparts the pivot movement moving its engaging portions out of engagement.

A lock nut device specially developed for axially fixing an internally splined propeller hub is characterized in that the locking element is a U-shaped curved locking plate extending in the axial plane over the nut and having spring legs lying in grooves in the nut to prevent rotation of the locking element relative to the nut. The legs having end portions for engagement with the internal splines of the propeller hub. The legs serve as levers or pivot arms which, in the engagement position, lie spaced from the nut surface, and which, when a wrench socket is slipped over the nut, are pressed against the nut surfaces thus moving the end portions from the engagement position.

The lock nut device according to the invention only requires enough space radially outside the nut to make room for the socket. While using a spark plug type socket, possibly in combination with an extender and joints, the nut device can be used in hidden and difficult to get at places. The lock spring helps hold the nut in the socket, which is particularly advantageous when removing a propeller from a boat in the water.

By using the splines of the propeller hub for engagement with the locking plate when locking a propeller with a lock nut according to the invention, an engagement circle with a relatively large radius is obtained, thus providing a large number of engagement or locking positions in one rotation.

BRIEF DESCRIPTION OF THE DRAWINGS

The invention will be described in more detail with reference to examples shown in the accompany drawings, where FIG. 1 shows a longitudinal section through a propeller hub and the propeller shaft with a first embodiment of a lock nut device according to the invention.

FIG. 2 shows an end view of the nut device in FIG. 1,

FIG. 3 shows an end view of a locking plate,

FIG. 4 shows a side view of the locking plate in FIG. 3,

FIGS. 6a and 6b show end views of first and second lock nuts in FIG. 5, and FIGS. 7a, 7b and FIGS. 8a, 8b, respectively, show end and side view of the first and second spring lock elements in FIG. 5.

DESCRIPTION OF THE PREFERRED EMBODIMENTS

Figure 5:
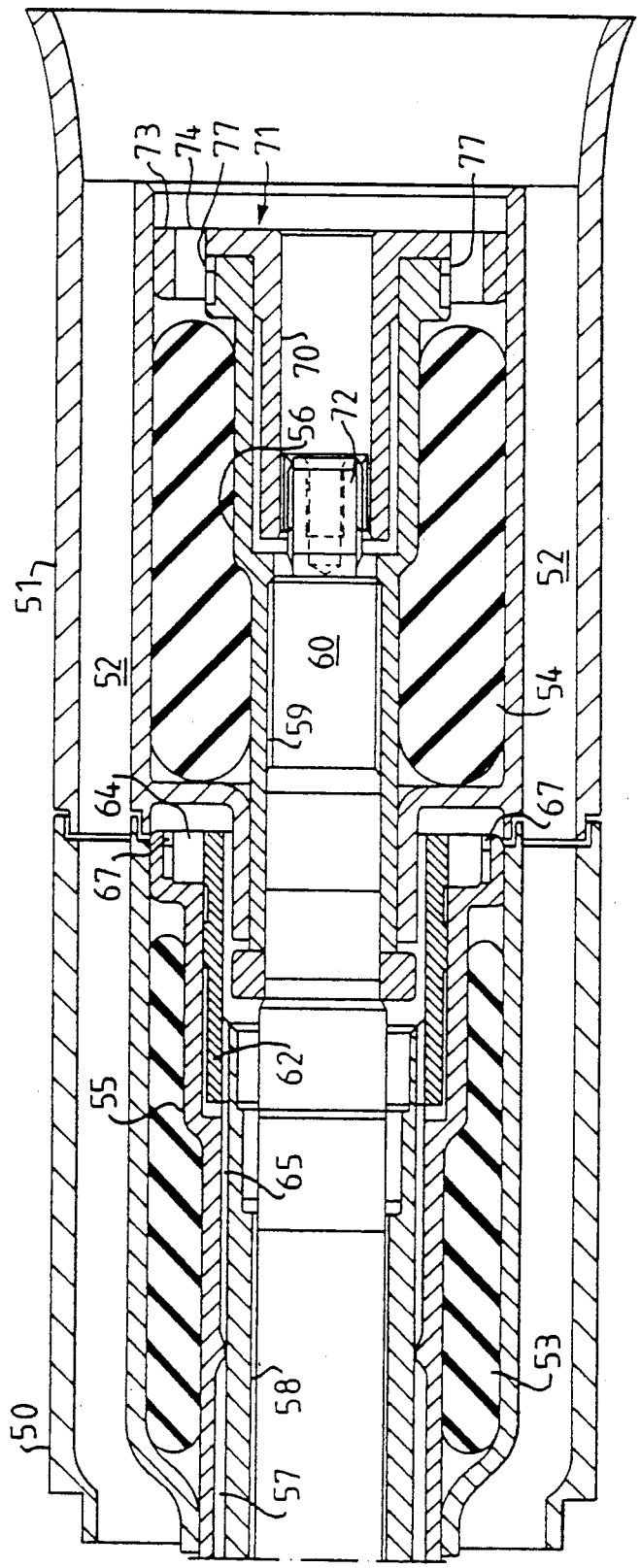
FIG. 5 shows a longitudinal section through a double hub arrangement with two additional embodiments of lock nut arrangements according to the invention.

In FIG. 1, 1 generally designates a propeller hub with a propeller blade 2 where the hub 1 consists of an outer hub sleeve 3, on which the blades 2 are disposed, an inner hub sleeve 4 and an intermediate bushing 5 of elastic material, which joins the sleeves 3 and 4 to each other. At the outer sleeve 3, there is fixed a bowl-shaped flow body 6 with a rear opening 7. A propeller shaft 8 has at its distal end a portion 9 with splines 10 and a portion 11 with threads 12.

A bushing 13 with internal splines 14 and external splines 15 is fixed against rotation on the shaft 8 by engagement with respective splines 10 and 14. The bushing 13 carries the inner hub sleeve 4 and fixes it against rotation relative to the shaft by engagement between the external splines 15 of the bushing 13 and the internal splines 16 of the inner hub sleeve 4. A lock nut device with the general designation 20 is screwed onto the threaded portion 11 on the shaft 8 to axially fix the propeller hub 1 on the propeller shaft.

The lock nut device 20 comprises an internally threaded 21 lock nut 22, consisting of a hexhead 23 and a collar 24 in one piece with the head. The nut head has grooves 25 in diametrically opposed engaging surfaces 26. The grooves 25 have a shallower portion 27 close to the outer end of the head, so as to form a shoulder 28. There are through-holes 29 in the collar 24 at the grooves 26. A groove 30 in the end surface of the head joins the grooves 25 to each other.

The lock nut device 20 also comprises a locking plate or locking spring 31 which is made as a strip of spring steel. The locking spring 31, which is shown separately in FIGS. 3 and 4, is bent into a U-shpae so that a pair of resilient legs 32 are formed. These legs have at their distal ends outwardly extending portions 33 with teeth 34, which are complementary to the internal splines 16 of the propeller hub 1. A pair of tongues 35 are stamped out of the legs 32 and are bent obliquely towards each other.

FIGS. 1 and 2 show the nut 22 and the spring 31 assembled. During assembly, the legs 32 are moved together somewhat from the position shown in FIG. 4, and the ends are inserted into the holes 29 until the ends of the tongues 35 snap into the grooves 25 behind the shoulder 28. The lock nut device 20 can now be handled as a unit without any risk of the parts falling apart.

FIG. 1 shows the nut device 20 mounted on the shaft 8 and tightened against the propeller hub 1, so that the collar 24 abuts against the inner hub sleeve 4. The teeth 34 on the end portions of the spring legs 32 engage the splines 16 of the hub sleeve 4, thus blocking the lock spring against rotation relative to the sleeve 4 and thereby also relative to the shaft 8. Since the lock spring 31, by the engagement with the legs 32, described above, is non-rotatable relative to the nut, the latter is also locked against rotation relative to the shaft.

As can be seen in FIG. 1 the legs 32 extend in the locking position obliquely outwards over the engagement surfaces of the nut head. When a socket which fits an engagement surfaces of the nut is slipped over the head 23, the legs 32 are pressed against their own spring force and the spring force of the tongues 35 down into the grooves 25, so that their end portions 33 are moved out of engagement with the splines of the hub sleeve 4. The nut 22 can now be screwed off the shaft 8. The resilience of the legs serves to hold the nut securely in the socket. In the example shown in FIG. 1, the device according to the invention allows the propeller to be removed without the flow body 6 being removed from the hub sleeve 3. It is thus sufficient to insert a wrench socket through the rear opening 7 in the body 6. Engagement with the nut can be achieved without the nut being visible or accessible from the side.

FIG. 5 shows a hub arrangement for a dual propeller drive unit with two other embodiments of lock nut devices according to the invention. In the FIG. 50 and 51 designate forward and rear propeller hub sleeves, respectively, of a type known per se, with exhaust ducts 52. The sleeves 50, 51 are joined via rubber bushings 53 and 54, respectively, with inner hub sleeves 55 and 56, respectively. The forward sleeve 55 is, via splines 57, non-rotatably joined to a hollow shaft 58, while the rear sleeve 56 is, via splines 59, non-rotatably joined to the shaft 60, which extends through the hollow shaft.

A nut element 61 with a tubular internally threaded portion 62 and an engagement collar 63 having three cavities 64 for engagement with a tool (not shown), is screwed onto a threaded portion 65 of the hollow shaft 58 of fix the hub sleeve axially. The nut element 61 is fixed against rotation by an annular lock spring element 65 provided with notches 66 (one shown), in which projections 67 of the hub sleeve engage to fix the element 65 against rotation. Spring tongues 68 extend into the cavities 64 of the collar 63, so that the nut element 61 is fixed against rotation. When the nut element 61 is to be screwed off to allow for removal of the hub sleeve from the shaft, a tool is used with three pins adapted to the notches 66, which when they are inserted into the notches press away the spring tongues 68, thus releasing the nut element from the locking element 65 so that it can be rotated with the aid of the tool.

The rear hub sleeve 56 is fixed in a corresponding manner. A threaded tubular portion 70 on a nut element 71 is screwed onto a threaded extension 72 of the inner propeller shaft 60 and it abuts with a collar 73 against the end of the hub sleeve 56. The collar 73 has three holes 74 for engagement with a tool (not shown). The nut element 71 is fixed against rotation by an annular lock spring element 75, which has cavities 76 (one shown) corresponding in the element 65, into which cavities projections 77 on the hub sleeve engage. Spring tongues 78 extend into the holes 74 so that the nut element 71 can be fixed against rotation. The element can be unscrewed by inserting three pins on a tool into the hole 74, thus pushing away the tongues 78 to permit rotation of the element.

The invention principle can also be used in nut devices with other types of engagement. For example, a nut with an internal engagement surface, e.g. a so-called socket head nut, can be used. It can be made with through-holes extending from the outside of the nut into the head socket and through which a suitably bent lock spring extends. When a hex wrench is pushed into the socket, it comes into contact with the spring and moves its legs out of engagement.

I claim:

1. Lock nut arrangement comprising, firstly, a threaded nut element, the threads of which are disposed to engage threads on a second element, said nut element having a profile portion for engagement with a tool and, secondly, a locking element adapted to be non-rotatably coupled to the nut element, said locking element also adapted to be non-rotatably coupled to another element (4), said locking element being at least partially resilient (31; 61; 71) with a portion (32; 68; 78) extending over the tool engaging profile portion (23; 63; 73) of the nut element (22; 61; 71), and said locking element being so formed so that it is forced out of engagement with said other element (4) or with the nut element (61; 73) when a tool is moved into engagement with the profile engagement portion (23; 63; 73) of the nut element.

2. Lock nut arrangement according to claim 1, wherein the locking element has legs (32) and is a U- shaped curved locking plate (31) extending in the axial plane over a profiled head (23) on the nut element (22), said legs (32) extending between limiting surfaces on the nut element which prevent rotation of the plate relative to the nut element, said legs having end portions (33) for engagement with said other element (4).

3. Lock nut arrangement according to claim 2, wherein the nut head (23) is provided with a pair of diametrically opposed axial grooves (25), into which the legs (32) of the locking plate can be pressed, when a tool socket with a profile complementary to the profile of the nut head is slipped over the nut head.

4. Lock nut arrangement according to claim 3, wherein the legs (32) of the locking plate (31) have spring tongues (35) which extend into the axial grooves (25) of the nut head (23) and urge the legs out of the axial grooves.

5. Lock nut arrangement according to claim 4, wherein the spring tongues (35) are directed obliquely towards the end of the nut element (22) facing away from the end portions, said axial grooves (25) having a deeper portion directly in front of the spring tongues and a shallower portion (27) axially outside the ends of the tongues, and wherein a shoulder (28) between the deeper and shallower portions forms an abutment which axially fixes the locking plate (31) on the nut element (22).

6. Lock nut arrangement according to claim 5, wherein the spring tongues (35) are punched from the legs (32) of the locking plate (31) and are bent inwards towards the axial grooves (25) in the nut head.

7. Lock nut arrangement according to claim 2, wherein the nut element consists of a head (23) with a hexagonal profile and a plate (24) joined to the head and having through-holes (29), through which the legs (31) of the locking plate extend.

8. Lock nut arrangement according to claim 1, wherein the locking element (61; 71) is a resilient, closed ring which is placed in an intermediate space between a surface on a head (63; 78) of the nut element and a surface on said second element (55; 56) and has, on the one hand, at least one resilient tongue (68; 78), which cooperates with a portion (64; 74) of the nut element serving as an engagement portion, to prevent rotation of the nut element relative to the ring and, on the other hand, at least one profile (66; 76) cooperating with the other element, preventing rotation of the ring relative to the other element.

9. Lock nut device for axially fixing an internally splined (16) propeller hub (1) on an externally splined propeller shaft (8), comprising: an internally threaded nut (22) disposed to be screwed onto a threaded portion (11) of a propeller shaft, and a locking element (31) with means for fixing the nut against rotation on the shaft, said locking element being a U-shaped bent element (31) which extends in an axial plane over the nut (22) and having spring legs (32), which lie in grooves (25) in the nut to prevent rotation of the locking element relative to the nut, said legs having end portions (33), which are formed to engage the internal splines (16) of the propeller hub (1), said legs, in the engagement position of the end portions, lying at such a distance from the nut that they, with the aid of a socket which is adapted to be slipped over the nut, can be pressed against the nut surface so that the end portions are moved from the engagement position.

10. Lock nut device according to claim 9, wherein the locking element is a locking plate (31), and said end portions (33) are radially outwardly bent and have toothed end edges (34), the teeth of which fit the splines (16) of the propeller hub.

11. Lock nut device according to claim 10, wherein spring tongues (35) are stamped out of the legs (32) and are bent inwards towards the axial grooves (25) in the nut (22), said tongues being directed obliquely towards the end of the nut facing away from the end portions, said axial grooves (25) having a deeper portion directly opposite the spring tongues and a shallower portion (27) axially outside the ends of the tongues so as to form a shoulder (28) between the deeper and the shallower portions, said shoulder serving as an abutment which axially fixes the locking plate on the nut.

12. Lock nut device according to claim 9, wherein the largest radius of the nut (23) is less than the inner radius of the propeller hub (19), said nut being joined to a collar (24) which is dimensioned for abutment against an end surface of the propeller hub, and said collar having through-holes (29), through which the legs (32) of the locking element extend.

* * * * *